Dec. 22, 1936. P. L. HINES 2,065,458
MEANS FOR ATTACHING SUNSHADE GLASSES TO SPECTACLES
Filed March 27, 1936
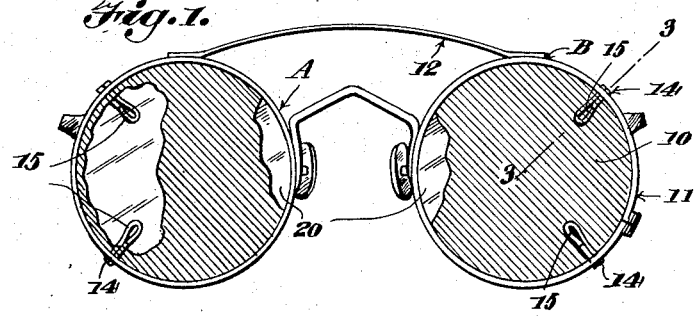
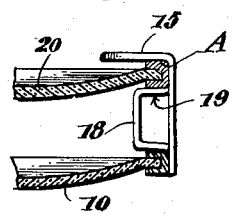
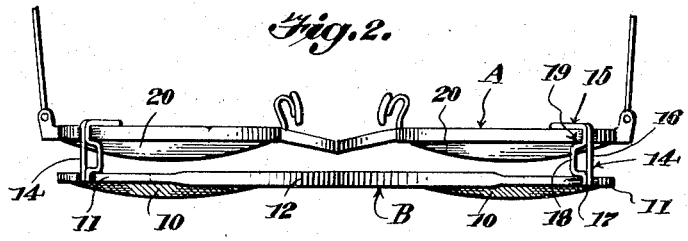
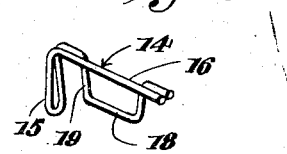
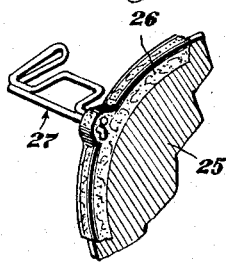
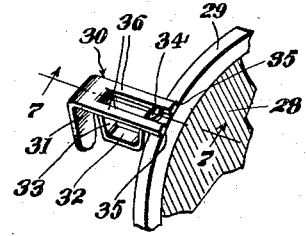
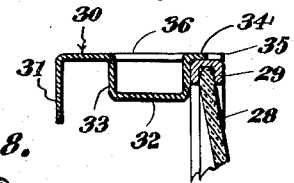
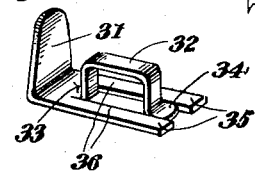
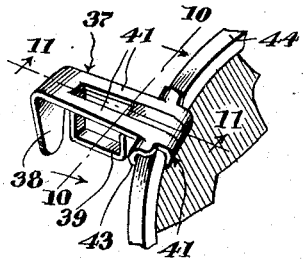
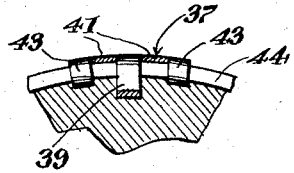
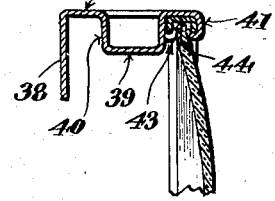
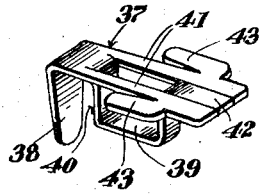
Inventor
POSIE L. HINES
By Irving A. McEathran
Attorney Patented Dec. 22, 1936

2,065,458

UNITED STATES PATENT OFFICE 2,065,458

MEANS FOR ATTACHING SUNSHADE GLASSES TO SPECTACLES

Posie L. Hines, Roanoke, Va.

Application March 27, 1936, Serial No. 71,306

7 Claims. (Cl. 88—41)

This invention relates to means for attaching sunshade or anti-glare lenses to spectacles and other glasses, and has for one of its objects the production of a simple and efficient means for facilitating the attaching of the shade or anti-glare lenses to other glasses in a manner to prevent the scratching of the lenses of the glasses to which the shade or anti-glare lenses are attached.

A further object of this invention is the production of a simple and efficient means for supporting a pair of sunshade or anti-glare glasses in front of a pair of primary glasses such as spectacles and the like, in a manner whereby the lenses of the respective glasses will be definitely spaced and whereby the securing means will hold the lenses of the respective glasses spaced sufficiently apart to prevent the scratching of the lenses of the primary glasses while placing the sunshade or anti-glare glasses in position.

Other objects and advantages of the present invention will appear throughout the following specification and claims.

In the drawing:—

Figure 1 is a front view of a pair of glasses showing the sunshade or anti-glare lenses mounted upon a pair of primary glasses;

Figure 2 is a top plan view of the assembled glasses;

Figure 3 is a transverse section taken on line 3—3 of Figure 1;

Figure 4 is a perspective view of the spacing and securing clips;

Figure 5 is a fragmentary perspective view of a portion of a lens showing a spacing and securing clip carried by an amber, composition, or similar frame;

Figure 6 is a perspective view of a modified form of spacing and securing clip formed from sheet metal;

Figure 7 is a longitudinal section taken on line 7—7 of Figure 6;

Figure 8 is an inverted perspective view of the spacing and securing clip shown in Figure 6;

Figure 9 is a perspective view of a still further modified form of clip;

Figure 10 is a transverse section taken on line 10—10 of Figure 9;

Figure 11 is a longitudinal section taken on line 11—11 of Figure 9; and

Figure 12 is a perspective view of the clip shown in Figure 9 detached from the supporting lens.

By referring to the drawing it will be seen that A designates the spectacles or primary pair of glasses to which a pair of anti-glare lenses or sunshade glasses B are adapted to be detachably secured.

The anti-glare or sunshade glasses comprise preferably a pair of colored or sunshaded lenses 10, which are preferably mounted within the lens frames 11, the lens frames 11 being connected by a spring bow member 12. A plurality of spaced clips 14 are secured to the edges of the frames 11, one clip being preferably arranged above the other, and being located along the outer side of the frames, as shown in Figure 1. As illustrated in Figures 1 to 5, inclusive, each clip 14 is preferably formed of wire and comprises a hook member 15 which is adapted to fit over the edge of the primary glasses frame or spectacle frame A, as shown in Figure 2. The clip 14 also comprises a pair of parallel strands 16 the ends of which are fastened in any suitable or desired manner, such for instance as by welding, as at 17, to the side faces of the frames 11. One of the strands 16 is bent inwardly to provide a shoulder portion 19 which is arranged in spaced relation to the hook 15 to provide a socket of sufficient size to receive the edge of the spectacle or glasses frame A, as shown in detail in Figure 3, the wire clip 14 being preferably formed of spring wire whereby the edge of the spectacle or glasses frame A may be tightly gripped between the shoulder portion 19 and the spring hook 15, in this way providing an efficient releasably engaging fastening means for supporting the sunshade or anti-glare lenses 10 in definite spaced relation with respect to the lenses 20 of the spectacle or primary glasses frame A. Attention also should be given to the fact that the rectangular offset loop 18 and the relatively spaced arrangement of the fasteners or clips 14 will provide an efficient means for definitely holding the anti-glare or shade lenses 10 away from the front faces of the lenses 20 and due to the location of these clips, as well as to the offset loops 18, the shade lenses 10 may be easily placed over the front of the lenses 20 without fear of scratching or marring the front faces of the lenses 20.

It has been found through actual experience that in placing the conventional shade glasses or reading glasses over a primary pair of glasses, the lenses of the primary pair of glasses very often become scratched or marred, rendering the same useless due to the contact of the overlapping lenses and due to the fact that the securing clips do not provide any definite spacing shoulder such as the shoulder 19 to hold the lenses apart when placing the shade lenses over the primary lenses and also when removing the same. In placing the shade or anti-glare lenses over the front of the spectacles or primary pair of glasses, the wearer may easily hook the clips over the edges of the primary pair of glasses A, the clips only engaging the edges of the frame of the primary glasses, and when mounted in position, the lenses 10 and 20 will be definitely spaced to prevent the injuring or scratching of the lenses 10 20.

It should be understood that it is not desired to limit the present invention to the combination of a pair of spectacles and a pair of shaded or anti-glare lenses since the same securing means may be employed for attaching reading glasses over the primary pair of glasses, which primary pair of glasses may constitute a support, this method being in some instances used to avoid the necessity of wearing bifocal lenses or substituting one set of glasses by another set.

In Figure 5 there is shown a type of shaded lenses 25 having an amber or composition frame 26 of suitable character to which a clip 27 similar to that as previously described is used.

In Figures 6, 7, and 8 there is shown a further modified form of the invention wherein a lens 28 is illustrated having a frame 29 of suitable character, the clip 30 being struck from a blank sheet of metal and having a securing hook 31 at one end and an offset punched loop 32 to provide an engaging shoulder 33. The free end of the loop 34, as well as the ends 35 of the fingers 36 of the clip 30, are welded or fastened in any suitable or desired manner to the edge of the frame 29.

In Figures 9 to 12 inclusive, there is shown a still further modified form of the invention wherein a clip 37 is illustrated formed from a blank sheet of metal and having a hook 38 at one end. An offset punched loop 39 is formed from the body of the clip to provide a spaced shoulder 40 similar to the shoulder 19, this punching action providing a pair of parallel fingers 41 between which fingers is located the free end 42 of the loop 39. A pair of ears 43 are formed upon either side of the fingers 41 and the free ends of the fingers 41 are then bent or coiled around the shaded glasses frame 44, as shown in Figure 11, the ears 43 being bent or coiled around the frame in the opposite direction to provide an efficient securing means for attaching the clip to the shade glasses frame 44.

In all of the forms shown, it should be noted that the corners or bends are preferably rounded and the metal employed is preferably of a spring nature, the space between the hooks and the shoulder portions being preferably slightly wider at the mouth than at their inner ends to provide a spring gripping action between the hook and the shoulder portions thereby firmly holding the clip in position when once applied.

Having described the invention, what I claim as new is:—

1. In combination with an anti-glare lens, and a frame for said lens, a mounting clip for said lens and comprising a shank, a depending bill at one end of said shank, a U-shaped member depending from said shank intermediate the length thereof and having one arm in spaced and confronting relation to said bill whereby an eye-glass lens may be gripped between the bill and said arm, the other end of said shank being secured to the frame of the anti-glare lens to mount the clip thereon with the clip extending rearwardly from the anti-glare lens and the U-shaped member in position to engage between the anti-glare lens and an eye-glass lens to maintain the anti-glare lens spaced from the eye-glass lens.

2. In combination with an anti-glare lens, and a frame for said lens, a mounting clip comprising a shank, a depending bill at one end of said shank, said shank having a plurality of longitudinally extending sections in side-by-side relation to each other, one section being bent to form a depending U-shaped member having one arm disposed in spaced and confronting relation to said bill whereby an eye-glass lens may be gripped between the bill and said arm, the upper end of the other arm of the U-shaped member and the adjacent end of another section of the shank being secured to the frame of the anti-glare lens to mount the clip thereon with the clip extending rearwardly therefrom and the U-shaped member disposed in position to engage between the anti-glare lens and an eye-glass lens and maintain the anti-glare lens spaced from the eye-glass lens.

3. In combination with an anti-glare lens, a frame for said lens, a mounting clip comprising a strand of resilient material folded back upon itself intermediate its length and then bent in spaced relation to the fold to form a shank and a bill depending from one end thereof, said shank consisting of a plurality of strand sections disposed in side-by-side relation to each other, one strand section being bent to form a depending U-shaped member having one arm spaced from said bill whereby an eye-glass lens may be gripped between the bill and said arm, the other arm of the U-shaped member having its upper end portion bent to form a tongue disposed in side-by-side relation to an end portion of another strand section and together therewith being rigidly secured to the frame of the anti-glare lens to mount the clip thereon with the clip extending rearwardly therefrom and the U-shaped member disposed in position to engage between anti-glare lens and an eye-glass lens and maintain the anti-glare lens spaced from the eye-glass lens.

4. In combination with an anti-glare lens and a frame for said lens, a mounting clip comprising a strip of resilient metal bent in spaced relation to one end to provide a shank and a bill depending from one end of the shank, said shank being split from its opposite end to form a plurality of tongues extending longitudinally of the shank, one tongue being bent to form a depending U-shaped member having one arm disposed in spaced and confronting relation to said bill whereby an eye-glass lens may be gripped between the bill and the said arm of the U-shaped member, the other arm of the U-shaped member and the adjacent end portion of another tongue being secured to the frame of the anti-glare lens to mount the clip thereon with the clip extending rearwardly from the anti-glare lens and the U-shaped member disposed in position to hold the anti-glare lens spaced from the eye-glass lens.

5. In combination with an anti-glare lens and a frame for said lens, a mounting clip comprising a strip of resilient metal bent in spaced relation to one end to provide a shank and a bill depending from one end of the shank, and a tongue struck from said shank longitudinally thereof and bent to form a depending U-shaped member having one arm in spaced and confronting relation to said bill whereby an eye-glass lens may be gripped between the bill and the said arm, the other arm of said U-shaped member and adjacent portions of shank being firmly secured to the frame of the anti-glare lens to mount the clip thereon with the clip extending rearwardly from the anti-glare lens and the U-shaped member in position to hold the anti-glare lens spaced from the eye-glass lens.

6. In combination with an anti-glare lens and a frame for said lens, a mounting clip comprising a strip of resilient metal bent in spaced relation to one end to provide a shank and a bill depending from one end of the shank, said shank being split from its opposite end to provide an intermediate tongue and a plurality of side tongues, the intermediate tongue being bent to form a depending U-shaped member having one arm disposed in spaced and confronting relation to said bill whereby an eye-glass lens may be gripped between the bill and the said arm of the U-shaped member, another arm of the U-shaped member having its upper end extending between the side tongues and bent to form a lip disposed between end portions of the side tongues longitudinally thereof, said lip and the adjacent ends of the side tongues being firmly secured upon the frame of the anti-glare lens and the U-shaped member disposed in position to hold the anti-glare lens spaced from the eye-glass lens.

7. In combination with an anti-glare lens and a frame for said lens, a mounting clip comprising a strip of resilient metal bent in spaced relation to one end to provide a shank and a bill depending from one end of the shank, said shank being split from its opposite end to provide an intermediate tongue and a plurality of side tongues, the intermediate tongue being bent to form a depending U-shaped member having one arm disposed in spaced and confronting relation to said bill whereby an eye-glass lens may be gripped between the bill and the said arm of the U-shaped member, another arm of the U-shaped member having its upper end extending between the side tongues and bent to form a lip disposed between end portions of the side tongues longitudinally thereof, and ears carried by said side tongues being bent to form jaws gripping the frame of the anti-glare lens to mount the clip thereon with the clip extending rearwardly from the anti-glare lens and the U-shaped member disposed in position to space the anti-glare lens from the eye-glass lens.

POSIE L. HINES.